United States Patent Office 3,057,901
Patented Oct. 9, 1962

3,057,901
HYDROXYETHER ORGANOSILICON COMPOUNDS
Edwin P. Plueddemann, Midland, Mich., assignor to Dow Corning Corporation, Midland, Mich., a corporation of Michigan
No Drawing. Filed May 13, 1960, Ser. No. 28,861
4 Claims. (Cl. 260—448.2)

This invention relates to organosilicon compounds containing the group

It is the object of this invention to provide novel compositions of matter which are useful as surfactants in the preparation of polyurethane foams and which are useful as emulsifying agents for organosiloxane fluids and as lubricants. Other objects and advantages will be apparent from the following description.

This invention relates to compositions of the formula

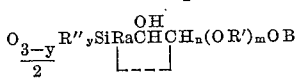

in which R″ is selected from the group consisting of hydrogen, monovalent hydrocarbonoxy radicals, monovalent hydrocarbon radicals, monovalent halohydrocarbon radicals and monovalent halohydrocarbonoxy radicals, y has a value from 0 to 3, R is a divalent radical attached to the silicon through a silicon-carbon bond and being selected from the group divalent hydrocarbon radicals, divalent halohydrocarbon radicals and divalent radicals composed of carbon, hydrogen and oxygen in the form of ether linkages, n has a value from 1 to 2, n being 1 when the C of the CH$_n$ group is linked directly to R in a cycloaliphatic ring, R′ is an alkylene group of 2 to 4 inclusive carbon atoms, m is an integer of at least 1 and B is of the group hydrogen, monovalent hydrocarbon radicals, monovalent hydrocarbonoxy radicals and monovalent halohydrocarbon radicals.

The compositions of this invention can be monomeric silanes when all the R″ groups attached to the Si are monovalent radicals such as hydrogen, hydrocarbon, hydrocarbonoxy, etc. In those cases in which two or less R″ groups are present, the compositions of this invention are dimeric or polymeric materials. These polymers can be either homopolymers or copolymers. In the latter case the copolymers can be those in which each silicon has a group

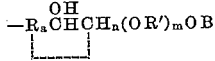

group attached thereto or the copolymer can be one in which only some of the silicon atoms have such groups attached thereto.

This invention includes within its scope copolymers of from .001 to 99.999 mol percent siloxane units of the formula

where R″, y, R, a, n, R′, m and B are as above defined and from .001 to 99.999 mol percent siloxane units of the formula

in which A is of the group hydrogen, monovalent hydrocarbon radicals, monovalent halohydrocarbon radicals, monovalent hydrocarbonoxy and halohydrocarbonoxy radicals and groups of the formula DSiA′$_3$ and DSiOSiA′$_3$ in which D is a divalent hydrocarbon radical and A′ is the same groups as A and x has a value from 0 to 3 inclusive.

The compositions of this invention are best prepared by reacting an epoxide of the formula

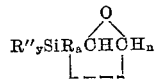

with alcohols of the formula H(OR′)$_m$OB in the presence of a Lewis acid such as stannic chloride, AlCl$_3$, BF$_3$ etherate and FeCl$_3$ at a temperature below 100° C. Under these conditions there is a preferential reaction of the hydroxyl of the alcohol with the epoxy group. Under these conditions, there will be no appreciable reaction between the epoxy group and any secondary hydroxyls or silicon-bonded hydrogen groups in the system as long as any primary hydroxyl groups remain. The reaction is best carried out on a molar ratio of at least 1 mol of alcohol per mol of epoxy group in the organosilicon epoxide.

The organosilicon epoxides used as intermediates in this invention can be prepared by any of the methods described in applicant's copending application Serial No. 747,579, filed July 10, 1958, the disclosure of which is hereby incorporated herein by reference.

Briefly two general methods are employed as shown in said application. One is the addition of an unsaturated epoxide such as allyl glycidyl ether or butadiene monoepoxide to a compound containing SiH groups in the presence of a platinum catalyst. This reaction goes at temperatures below 100° C.

The second general method is that of oxidizing an unsaturated hydrocarbon substituent on a silicon with peracetic acid. The latter method is particularly appropriate where a is 0. For example,

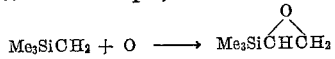

This reaction is best carried out by gently warming a mixture of the organosilicon compound with the peracid.

The compositions of this invention which are siloxanes can be prepared either by hydrolyzing the corresponding silanes in which R″ is a hydrolyzable group or they can be prepared by first preparing polymeric siloxanes containing SiH groups and thereafter reacting these siloxanes with an unsaturated epoxide and then with the alcohol as above described.

For the purpose of this invention R″ can be hydrogen or any monovalent hydrocarbonoxy radical such as methoxy, ethoxy, isopropoxy, octadecyloxy, allyloxy, hexenyloxy, cyclohexyloxy, cyclopentyloxy, cyclohexenyloxy, phenoxy, tolyloxy, xenyloxy or propargyloxy; any monovalent hydrocarbon radical such as methyl, ethyl, butyl, isopropyl, octadecyl, myricyl, vinyl, allyl, hexenyl, cyclohexyl, cyclopentyl, cyclohexenyl, phenyl, tolyl, xenyl, naphthyl, benzyl or beta-phenylethyl; any halogenated monovalent hydrocarbon radical such as chloromethyl, bromobutyl, chlorovinyl, 3,3,3-trifluoropropyl, bromophenyl, bromotolyl, α,α,α-trifluorotolyl, chlorocyclohexyl, iodocyclohexenyl, or chloroxenyl; and any halogenated hydrocarbonoxy radical such as chloromethoxy, betachloroethoxy, chlorophenoxy, bromoxenyloxy, chloromethallyloxy, perfluoroethoxy, or chlorocyclohexyloxy.

y can be 0 or any integer from 1 to 3. Thus, there can be from 0 to 3 R″ groups attached to the silicon atom.

In the compositions of this invention R is a divalent radical attached to the silicon through a silicon-carbon linkage. R can be any divalent hydrocarbon radical such as methylene, ethylene, butylene, phenylene, xenylene, tolylene or

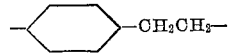

or any divalent halohydrocarbon radical such as chloroethylene, fluoroethylene, bromophenylene or bromoxenylene and any divalent ether radical of the type (—ROR—)$_x$ where R is as above defined and $x$ is an integer of at least 1 such as radicals of the formula —CH$_2$CH$_2$OCH$_2$CH$_2$—, $$-CH_2CH_2O\overset{Me}{C}HCH_2$$
$$-CH_2(OCH_2CH_2)_6OCH_2CH_2CH_2-$$
$$-CH_2OCH_2CH_2OCH_2CH_2-$$

and —CH$_2$OCH$_2$CH=CH—.

When $a$ is 0, then the group CHOHCH$_2$ is attached directly to the silicon atom. Also, when $n$ is 1, the group $$\overset{R}{\underset{|_____|}{C}HOHCH}$$

comprises a cycloaliphatic ring such as, for example,

<chem figure: cyclohexyl with OH — or —CH$_2$CH$_2$— cyclohexyl with OH>

For the purpose of this invention R′ can be ethylene, propylene or butylene and these radicals can be either straight or branched chain. Thus, for example, R′ can be —CH$_2$CH$_2$—, —CH$_2$CH$_2$CH$_2$—, $$-\overset{Me}{C}HCH_2- \quad \text{or} \quad -\overset{C_2H_5}{C}HCH_2-$$

In other words, the group OR′ can be derived from a commercially available alkylene oxide such as ethylene oxide, propylene oxide or butylene oxide.

As can be seen $m$ can be any integer of at least 1. Preferably $m$ has a value of from 1 to 2000. Thus, the compositions of this invention can be derived from either monoglycols or polyoxyalkylene glycols. It should be understood that it is not necessary that each R′ be the same. If desired, various combinations of the R′ radicals can be present in the same molecule.

B can be hydrogen or any monovalent hydrocarbon radical such as methyl, ethyl, butyl, octadecyl, allyl, hexenyl, isopropyl, phenyl, xenyl, tolyl, cyclohexyl, cyclohexenyl, benzyl or beta-phenylethyl, or any halo-hydrocarbon radical such as beta-chloroethyl, bromopropyl, chlorophenyl, perfluoroethyl, chlorocyclohexyl, chloroallyl, bromomethallyl and bromoxenyl. B can also be any halo-hydrocarbon radical such as beta-chloroethyl, chlorophenyl, bromoxenyl or perfluoroethyl or any hydrocarbonoxy radical such as —C$_6$H$_4$OPh, —CH(CH$_2$OEt)$_2$, —CH$_2$CH$_2$OMe and —CH$_2$OMe.

As stated above, the siloxanes of this invention can be copolymerized with conventional siloxanes of the formula $$A_xSiO_{\frac{4-x}{2}}$$

in which $x$ can range from 0 to 3. These siloxane units can be of the formula SiO$_2$, ASiO$_{3/2}$, A$_2$SiO or A$_3$SiO$_{1/2}$.

For the purpose of this invention A can be any hydrocarbon radical such as methyl, ethyl, butyl, octadecyl, myricyl, vinyl, allyl, hexenyl, cyclohexyl, cyclohexenyl, cyclopentyl, phenyl, tolyl, xenyl, naphthyl, benzyl or beta-phenylethyl or any halogenated hydrocarbon radical such as chloromethyl, 3,3,3-trifluoropropyl, perfluorovinyl, chlorophenyl, bromoxenyl, and chloronaphthyl or A can be of the formula DSiA′$_3$ and DSiOSiA′$_3$ in which A′ is the same as A and D is a divalent hydrocarbon radical such as methylene, ethylene, propylene, phenylene, cyclohexylene, —CH=CH—, and <chem: phenylene>CH$_2$CH$_2$—

Some of the products of this invention, particularly those in which the R″ groups are methyl radicals, are particularly beneficial as surfactants in polyurethane foams as is described and claimed in the copending application of Clyde L. Whipple entitled, "A Method of Preparing Polyurethane Foams," filed May 13, 1960, Serial No. 28,857. The additional compositions of this invention are useful as emulsifying agents for siloxane fluids and for lubricants.

The following examples are illustrative only and should not be construed as limiting the invention which is properly delineated in the appended claims.

In the specification and claims the following abbreviations are employed: Me for methyl, Et for ethyl, Bu for butyl and Ph for phenyl.

*Example 1*

Octamethylcyclotetrasiloxane was equilibrated at room temperature with tetramethyldisiloxane in the presence of a catalytic amount of sulfuric acid for 20 hours. The acid was neutralized with sodium bicarbonate and the product obtained had the formula $$HSi(OSi)_{20}SiH \quad \text{(Me}_2\text{ Me}_2\text{ Me}_2\text{)}$$

This siloxane was then reacted with a 50% molar excess of allyl glycidyl ether in the presence of 1 g. of a butanol solution of chloroplatinic acid containing 1% platinum. The mixture was stirred overnight and the product was then stripped to remove the excess allyl glycidyl ether. The liquid product obtained had the formula $$\overset{O}{\triangle}CH_2CHCH_2O(CH_2)_3SiO(SiO)_{20}Si(CH_2)_3OCH_2\overset{O}{\triangle}CHCH_2$$

200 g. of a butoxy endblocked monool consisting of a copolymer of ethylene oxide and propylene oxide in amount of 50% by weight of each and containing 80 total alkylene oxide units per molecule were mixed with 46 g. of the above epoxy siloxane, .5 g. of SnCl$_4$ catalyst and 250 cc. of benzene. The mixture was stirred overnight at 45° C., then filtered and stripped to remove the solvent. The residue had a viscosity of 2062 cs. at 25° C. and a refractive index of 1.4544. This material had the formula BuO(C$_2$H$_4$O)$_{46}$(C$_3$H$_6$O)$_{34}$CH$_2$CHCH$_2$O(CH$_2$)$_3$SiO(SiO)$_{20}$Si(CH$_2$)$_3$OCH$_2$CHCH$_2$(OC$_3$H$_6$)$_{34}$(OC$_2$H$_4$)$_{46}$OBu (with OH and Me$_2$ Me$_2$ Me$_2$ OH)

*Example 2*

1 mol of tetraethylene glycol was mixed with .5 mol of $$[\overset{O}{\triangle}CH_2CHCH_2O(CH_2)_3\overset{Me_2}{Si}]_2O$$

and 1 g. of SnCl$_4$. The mixture was allowed to stand overnight at 70° C. to give a fluid product having a viscosity of 506 cs. at 25° C., a specific gravity of 1.092 and a refractive index of 1.4608. The product had the formula $$[H(OC_2H_4)_4OCH_2\overset{OH}{C}HCH_2O(CH_2)_3\overset{Me_2}{Si}]_2O$$

*Example 3*

181 g. of $$[\overset{O}{\triangle}CH_2CHCH_2O(CH_2)_3\overset{Me_2}{Si}]_2O$$

600 g. of polyethylene glycol having a molecular weight of 600 and 2 g. of SnCl$_4$ were mixed with stirring. The temperature rose to 90° C. The reaction product was made alkaline with alcoholic KOH and then neutralized with CO$_2$. The product was stripped to 100° C. at 100 mm. and filtered to give a fluid having a viscosity of 900 cs. at 25° C. The product had the formula $$[H(OC_2H_4)_{14}OCH_2\overset{OH}{C}HCH_2O(CH_2)_3\overset{Me_2}{Si}]_2O$$

*Example 4*

1 mol of tetramethyldisiloxane was reacted with 1 mol of allyl glycidyl ether in accordance with the procedure of Example 1 to give the composition $$HSiOSi(CH_2)_3OCH_2\overset{O}{\triangle}CHCH_2 \quad \text{(Me}_2\text{ Me}_2\text{)}$$

This product was then mixed with 1 mol of vinylpentamethyldisiloxane in the presence of 1 g. of the catalyst of Example 1 and warmed to 150° C. The product was distilled at 120 to 140° C. at 1 mm. The resulting distillate had a density of .930 and a refractive index of 1.4346 both at 25° C. The formula was $$Me_3SiOSi\overset{Me_2}{C}H_2CH_2Si\overset{Me_2}{O}Si(CH_2)_3OCH_2\overset{O}{\overset{\diagup\diagdown}{C}HCH_2}$$

423 g. of this siloxane were added to 750 g. of the monomethyl ether of polyethylene glycol having a molecular weight of 750 in the presence of 4 g. of SnCl₄. The mixture was warmed at 50 to 60° C. until all the epoxy groups had reacted. The product was a viscous fluid having the formula $$Me_3SiOSi\overset{Me_2}{C}H_2CH_2Si\overset{Me_2}{O}Si(CH_2)_3OCH_2\overset{OH}{C}HCH_2O(C_2H_4O)_{17}Me$$

*Example 5*

The procedure of Example 4 was repeated except that the glycol ether employed was 1500 g. of the monobutyl-ether of a copolymer of 50% by weigth ethylene oxide and 50% by weight propylene oxide which ether has a molecular weight of 1500. The resulting product had the formula $$Me_3SiOSi\overset{Me_2}{C}H_2CH_2Si\overset{Me_2}{O}Si(CH_2)_3OCH_2\overset{OH}{C}HCH_2O(C_2H_4O)_{17}(C_3H_7O)_{13}B$$

*Example 6*

1 mol of $$\overset{O}{\overset{\diagup\diagdown}{C}H_2CHCH_2O}(CH_2)_3Si\overset{Me_2}{O}(Si\overset{Me_2}{O})_3Si\overset{Me_2}{(CH_2)_3}OCH_2\overset{O}{\overset{\diagup\diagdown}{C}HCH_2}$$

was reacted with 2 mols of polyethylene glycol having a molecular weight of 600 and 4 g. of SnCl₄ at room temperature. The chloride was neutralized with alcoholic KOH and then the solution treated with CO₂ to remove the excess KOH. The product was then filtered and stripped to 100° C. at 100 mm. The resulting material was a fluid having a viscosity of 300 cs. at 25° C. and had the formula $$H(OC_2H_4)_{14}O CH_2\overset{OH}{C}HCH_2O(CH_2)_3Si(OSi)_3OSi(CH_2)_3OCH_2\overset{OH}{C}HCH_2(OC_2H_3)_{14}OH$$

*Example 7*

Following the procedure of Example 6, H(OC₂H₄)₁₃OH was reacted with

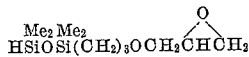

in the proportion of 1 mol of the former to .5 mol of the latter to give the fluid composition of the formula

This material had a refractive index of 1.4703 at 25° C. and a specific gravity at 25° C. of 1.096.

*Example 8*

When 1 mol of the compound $$HSiOSi(CH_2)_3OCH_2\overset{O}{\overset{\diagup\diagdown}{C}HCH_2}$$

is reacted with 1 mol of ethylene glycol in the presence of stannic chloride at 50° C., the fluid composition $$H\overset{Me_2Me_2}{SiOSi}(CH_2)_3OCH_2\overset{OH}{C}HCH_2OCH_2CH_2OH$$

is obtained.

*Example 9*

When the following epoxy silicon compounds are reacted on an equimolar basis with octapropylene glycol in the presence of stannic chloride, the following products are obtained.

| | Epoxy Organosilicon Compound | Product |
|---|---|---|
| 1 | $\left[\overset{O}{\diagup\diagdown}\underset{S}{\bigcirc}CH_2CH_2\overset{Me}{SiO}\right]_5$ | $\left[HO(C_3H_6)_8\underset{S}{\overset{H\,O}{\bigcirc}}CH_2CH_2\overset{Me}{SiO}\right]_5$ |
| 2 | $\overset{O}{\overset{\diagup\diagdown}{CH_2CH}}\overset{Me_2Me_2}{SiOSi}$ | $HO(C_3H_6O)_8CH_2\overset{OHMe_2Me_3}{CHSiOSi}$ |
| 3 | Copolymer of 50 mol percent vinylmethylsiloxane and 50 mol percent | Copolymer of 50 mol percent vinylmethylsiloxane and 50 mol percent |
| | $\overset{O}{\diagup\diagdown}\underset{S}{\bigcirc}CH_2CH_2\overset{Me}{SiO}$ | $HO(C_3H_6O)_8\underset{S}{\overset{H\,O}{\bigcirc}}CH_2CH_2\overset{Me}{SiO}$ |
| 4 | $H_2\overset{O}{\overset{\diagup\diagdown}{C-CH}}\underset{}{\bigcirc}\overset{Me}{SiO}$ | $HO(C_3H_6O)_8CH_2\overset{OH}{CH}\underset{}{\bigcirc}\overset{Me}{SiO}$ |
| 5 | $\overset{O}{\overset{\diagup\diagdown}{CH_2CH}}CH_2O(CH_2)_3\overset{Ph}{Si(OEt)_2}$ | $HO(C_3H_6O)_8CH_2\overset{OH}{CH}CH_2O(CH_2)_3\overset{Ph}{Si(OEt)_2}$ |
| 6 | $\left[\overset{O}{\overset{\diagup\diagdown}{CH_2CH}}CH_2O(CH_2)_3\overset{Me_2}{SiO}\right]_4Si$ | $\left[HO(C_3H_6O)_8CH_2\overset{OH}{CH}CH_2O(CH_2)_3\overset{Me_2}{SiO}\right]_4Si$ |
| 7 | $\left[\overset{O}{\overset{\diagup\diagdown}{CH_2CH}}CH_2O(CH_2)_3\overset{Me_2}{SiO}\right]_3SiPh$ | $\left[HO(C_3H_6O)_8CH_2\overset{OH}{CH}CH_2O(CH_2)_3\overset{Me_2}{SiO}\right]_3SiPh$ |
| 8 | A copolymer of 5 mol percent $\overset{O}{\overset{\diagup\diagdown}{CH_2CH}}CH_2O(CH_2)_3\overset{Me}{SiO}$, the remainder of the copolymer being monotrifluoropropylsiloxane. | A copolymer of 5 mol percent $HO(C_3H_6O)_8CH_2\overset{OH}{CH}CH_2O(CH_2)_3\overset{Me}{SiO}$, the remainder of the copolymer being monotrifluoropropylsiloxane. |

| | Epoxy Organosilicon Compound | Product |
|---|---|---|
| 9 | A copolymer of 33⅓ mol percent chlorophenylmethylsiloxane, 33⅓ mol percent $\overset{O}{\overset{\triangle}{CH_2CHCH_2}}O(CH_2)_3\overset{Ph}{\underset{}{Si}}O$ and 33⅓ mol percent $\overset{O}{\overset{\triangle}{CH_2CHCH_2}}O(CH_2)_3\overset{Me}{\underset{}{Si}}O$ | A copolymer of 33⅓ mol percent chlorophenylmethylsiloxane, 33⅓ mol percent $HO(C_3H_6O)_8CH_2\overset{OH}{\underset{}{CH}}CH_2O(CH_2)_3\overset{Ph}{\underset{}{Si}}O$ and 33⅓ mol percent $HO(C_3H_6O)_8CH_2\overset{OH}{\underset{}{CH}}CH_2O(CH_2)_3\overset{Me}{\underset{}{Si}}O$. |
| 10 | $\overset{O}{\overset{\triangle}{CH_2CHCH_2}}CH_2\overset{C_6H_4Cl}{\underset{}{Si}}(OEt)_2$ | $HO(C_3H_6O)_8CH_2\overset{OH}{\underset{}{CH}}CH_2CH_2\overset{C_6H_4Cl}{\underset{}{Si}}(OEt)_2$. |
| 11 | $\overset{O}{\overset{\triangle}{CH_2CHCH_2}}CH_2\overset{CH_2CH_2CF_3}{\underset{}{Si}}(OC_6H_4Cl)_2$ | $HO(C_3H_6O)_8CH_2\overset{OH}{\underset{}{CH}}CH_2CH_2\overset{CH_2CH_2CF_3}{\underset{}{Si}}(OC_6H_4Cl)_2$. |
| 12 | $\overset{O}{\overset{\triangle}{CH_2CHCHClCH_2}}Si(C_6H_{11})_3$ | $HO(C_3H_6O)_8CH_2\overset{OH}{\underset{}{CH}}CHClCH_2Si(C_6H_{11})_3$. |
| 13 | $\overset{O}{\overset{\triangle}{CH_2CHCH_2}}O(C_2H_4O)_8(CH_2)_3\overset{Me}{\underset{}{Si}}(OPh)_2$ | $HO(C_3H_6O)_8CH_2\overset{OH}{\underset{}{CH}}CH_2O(C_2H_4O)_8(CH_2)_3\overset{Me}{\underset{}{Si}}(OPh)_2$. |
| 14 | $\overset{O}{\overset{\triangle}{CH_2CHO}}\overset{CH_3}{\underset{}{CHCH_2}}OCH_2CH_2\overset{H}{\underset{}{Si}}(OEt)_2$ | $HO(C_3H_6O)_8CH_2\overset{OH}{\underset{}{CHO}}\overset{CH_3}{\underset{}{CHCH_2}}OCH_2CH_2\overset{H}{\underset{}{Si}}(OEt)_2$. |
| 15 | $\overset{O}{\overset{\triangle}{CH_2CHCH_2}}CH_2\overset{Ph_2}{\underset{}{Si}}OEt$ | $HO(C_3H_6O)_8CH_2\overset{OH}{\underset{}{CH}}CH_2\overset{Ph_2}{\underset{}{Si}}OEt$. |
| 16 | $\overset{O}{\overset{\triangle}{CH_2CHCH_2}}CH_2SiO_{3/2}$ | $HO(C_3H_6O)_8CH_2\overset{OH}{\underset{}{CH}}CH_2CH_2SiO_{3/2}$. |

Example 10

When 1 mol of $$HO(\overset{Et}{\underset{}{CH}}CH_2O)_6CH(CH_2OMe)_2$$

is reacted with 1 mol of

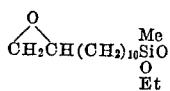

in the presence of stannic chloride, the siloxane of the formula $$(MeOCH_2)_2CH(O CH_2\overset{Et}{\underset{}{CH}})_6O CH_2\overset{OH}{\underset{}{CH}}(CH_2)_{10}\underset{\underset{Et}{O}}{\overset{Me}{Si}}O$$

is obtained.

Example 11

When the following epoxy silicon compounds are reacted with the following glycols on a 1 to 1 molar basis in accordance with the method of Example 1, the following products are obtained:

| Epoxy silicon compound | Glycol | Product |
|---|---|---|
| $EtO\overset{Me_2}{\underset{}{Si}}O\overset{Me_2}{\underset{}{Si}}CH_2CH_2\overset{O}{\overset{\triangle}{CH}CH_2}$ | $H(OC_2H_4)_{200}OCH_2CH=CH_2$ | $EtO\overset{Me_2}{\underset{}{Si}}O\overset{Me_2}{\underset{}{Si}}(CH_2)_2\overset{H}{\overset{O}{CH}}CH_2O(C_2H_4O)_{200}OCH_2CH=CH_2$. |
| $CH_2=CH\overset{Me_2}{\underset{}{Si}}\langle\overset{Me_2}{\underset{}{\hexagon}}\rangle\overset{Me_2}{\underset{}{Si}}CH_2\overset{O}{\overset{\triangle}{CH}CH_2}$ | $ClC_2H_4O(C_2H_4O)_{500}H$ | $CH_2=CH\overset{Me_2}{\underset{}{Si}}\langle\overset{Me_2}{\underset{}{\hexagon}}\rangle\overset{Me_2}{\underset{}{Si}}CH_2\overset{H}{\overset{O}{CH}}CH_2O(C_2H_4O)_{500}C_2H_4Cl$. |
| $Br\langle\hexagon\rangle O\overset{Me_2}{\underset{}{Si}}O\overset{Me_2}{\underset{}{Si}}CH_2\overset{O}{\overset{\triangle}{CH}CH_2}$ | $PhO(C_2H_4)_{20}H$ | $Br\langle\hexagon\rangle O\overset{Me_2}{\underset{}{Si}}O\overset{Me_2}{\underset{}{Si}}CH_2\overset{H}{\overset{O}{CH}}CH_2(OC_2H_4)_{20}OPh$. |

That which is claimed is:

1. A composition of matter of the formula $$O_{\frac{3-y}{2}}R''_ySiR_a\overset{OH}{\underset{}{CH}}CH_n(OR')_mOB$$

in which R'' is selected from the group consisting of hydrogen, monovalent hydrocarbonoxy radicals, monovalent hydrocarbon radicals, monovalent halohydrocarbon radicals and monovalent halohydrocarbonoxy radicals, y has a value from 0 to 3 inclusive, R is a divalent radical attached to the silicon through a siliconcarbon linkage and being selected from the group consisting of divalent hydrocarbon radicals, divalent halohydrocarbon radicals and divalent radicals composed of carbon, hydrogen and oxygen in the form of an ether linkage, a has a value from 0 to 1 inclusive, n has a value from 1 to 2 inclusive, n being 1 when the C of the $CH_n$ group is linked directly to R in a cycloaliphatic ring, R' is an alkylene radical of from 2 to 4 inclusive carbon atoms, m is an integer of at least 4 and B is selected from the group consisting of hydrogen, monovalent hydrocarbon radicals, monovalent halohydrocarbon radicals and monovalent hydrocarbonoxy radicals.

2. A composition in accordance with claim 1 where R'' is methyl and y has a value from 1 to 2 inclusive.

3. As a composition of matter a copolymer of from .001 to 99.999 mol percent siloxane units of the formula $$O_{\frac{3-y}{2}}R''_ySiR_a\overset{OH}{\underset{}{CH}}CH_n(OR')_mOB$$

in which y has a value from 0 to 2 inclusive, R'' is selected from the group consisting of hydrogen, monovalent hydrocarbon radicals, monovalent halohydrocarbon radicals, monovalent hydrocarbonoxy radicals and monovalent halohydrocarbonoxy radicals, R is a divalent radical attached to the silicon through a silicon-carbon linkage and being selected from the group consisting of divalent hydrocarbon radicals, divalent halohydrocarbon radicals and divalent radicals composed of carbon, hydrogen and oxygen in the form of an ether linkage, a has a value from 0 to 1 inclusive, n has a value from 1 to 2 inclusive, n being 1 when the C of the $CH_n$ group is linked directly to R in a cycloaliphatic ring, R' is an alkylene radical of from 2 to 4 inclusive carbon atoms, m is an integer of at least 4 and B is selected from the group consisting of hydrogen, monovalent hydrocarbon radicals, monovalent halohydrocarbon radicals and monovalent hydrocarbonoxy radicals and from .001 to 99.999 mol percent siloxane units of the formula $$A_xSiO_{\frac{4-x}{2}}$$

in which A is selected from the group consisting of hydrogen, monovalent hydrocarbon radicals, monovalent halohydrocarbon radicals, monovalent hydrocarbonoxy radicals and monovalent halohydrocarbonoxy radicals and radicals of the formula $DSiA'_3$ and $DSiOSiA'_3$ where D is a divalent hydrocarbon radical and A' is the same as A and $x$ has a value from 0 to 3 inclusive.

4. A copolymer in accordance with claim 3 in which R" is methyl, A is methyl, $y$ has a value from 1 to 2 and $x$ has a value from 2 to 3.

References Cited in the file of this patent

FOREIGN PATENTS 1,185,009  France _____ Feb. 9, 1959

OTHER REFERENCES

Shechter et al.: Ind. and Eng. Chem., vol. 48, No. 1 (1956), pp. 86–93.

Dow Corning Corp., New Products Information, Bulletin No. –2–101, December 1957.

UNITED STATES PATENT OFFICE
CERTIFICATE OF CORRECTION

Patent No. 3,057,901                                          October 9, 1962

Edwin P. Plueddemann

It is hereby certified that error appears in the above numbered patent requiring correction and that the said Letters Patent should read as corrected below.

Column 2, lines 34 and 35, the formula should appear as shown below instead of as in the patent:

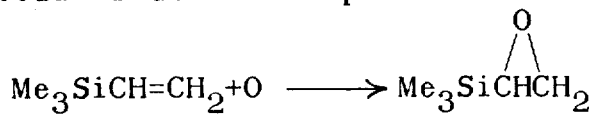

column 5, lines 10 and 11, the formula should appear as shown below instead of as in the patent:

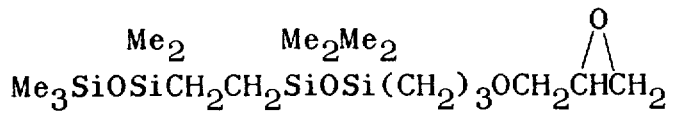

same column 5, lines 33 and 34, the formula should appear as shown below instead of as in the patent:

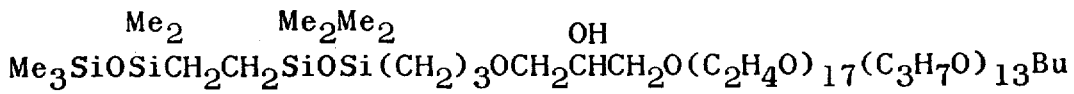

column 6, lines 6 and 7, the formula should appear as shown below instead of as in the patent:

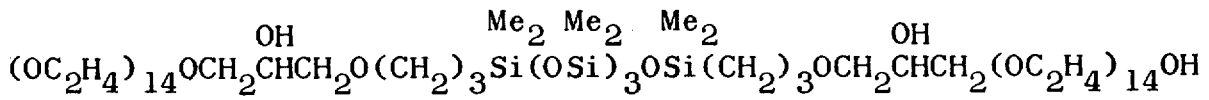

columns 5 and 6, in the table, second column, the second formula should appear as shown below instead of as in the patent:

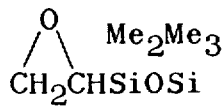

same table, second column, the seventh formula should appear as shown below instead of as in the patent:

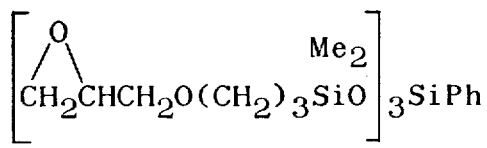

3,057,901 column 7, lines 34 to 36, the formula should appear as shown below instead of as in the patent:

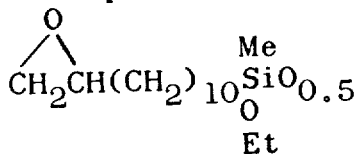

same column 7, lines 41 to 43, the formula should appear as shown below instead of as in the patent:

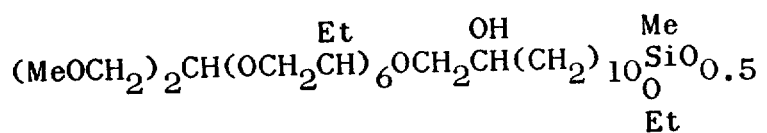

Signed and sealed this 18th day of June 1963.

(SEAL)
Attest:

ERNEST W. SWIDER

DAVID L. LADD
Commissioner of Patents